(No Model.) 6 Sheets—Sheet 1.

E. A. JOHNSTON & B. R. BENJAMIN.
MOWER.

No. 578,404. Patented Mar. 9, 1897.

WITNESSES:
E. E. Clinton,
John M. Culver.

INVENTORS:
Edward A. Johnston
Bert R. Benjamin
BY
R. B. Swift
ATTORNEY.

(No Model.) 6 Sheets—Sheet 2.

E. A. JOHNSTON & B. R. BENJAMIN.
MOWER.

No. 578,404. Patented Mar. 9, 1897.

WITNESSES:
E. E. Clinton
John M Culver

INVENTORS
Edward A. Johnston
Bert R. Benjamin
BY R. B. Swift
ATTORNEY.

(No Model.)  6 Sheets—Sheet 6.

E. A. JOHNSTON & B. R. BENJAMIN.
MOWER.

No. 578,404. Patented Mar. 9, 1897.

Fig. 8

WITNESSES:
John M. Culver.
Geo. B. Adams.

INVENTORS:
Edward A. Johnston
Bert. R. Benjamin
By T. B. Swift.
ATTORNEY.

UNITED STATES PATENT OFFICE.

EDWARD A. JOHNSTON AND BERT R. BENJAMIN, OF CHICAGO, ILLINOIS, ASSIGNORS TO THE McCORMICK HARVESTING MACHINE COMPANY.

MOWER.

SPECIFICATION forming part of Letters Patent No. 578,404, dated March 9, 1897.

Application filed June 22, 1896. Serial No. 596,519. (No model.)

*To all whom it may concern:*

Be it known that we, EDWARD A. JOHNSTON and BERT R. BENJAMIN, citizens of the United States, residing at Chicago, county of Cook, and State of Illinois, have invented certain new and useful Improvements in Mowing-Machines, of which the following is a specification.

Our improvement relates to side-cut mowing-machines, in which the finger-bar projecting from the side of the truck of the machine is pivoted to a coupling-frame at one end, which coupling-frame is in turn pivoted to the frame of the machine. The outer end of the finger-bar freely rests upon the ground and the whole finger-bar conforms to the inequalities of the ground as it is drawn forward in the operation of the machine; and it has for its object to provide means of controlling the cutting apparatus from the seat, whereby it can be raised and lowered to pass obstructions or the finger-bar turned up vertically to the side of the machine for transportation and to pass large obstructions that may be encountered in the field, and also has for its object the application of spring-power to the cutting apparatus to make it rest more lightly upon the ground, thus decreasing draft by relieving the friction on the parts upon the ground.

It also has for its object the turning up vertically of the finger-bar portion of the cutting apparatus while the machine is in operation, which necessitates, in a machine in which the motion is transmitted to the reciprocating knife by a long pitman from gearing positioned on the frame of the machine, that the motion of the knife shall be stopped after the finger-bar has been raised to a certain height.

These objects we accomplish by the mechanisms that are shown in the accompanying drawings and which will be hereinafter fully described in the specification.

In the drawings.

Similar letters refer to similar parts throughout the several views.

Referring to the drawings, A represents the main frame; B, the drive-wheels; C, the tongue; D, the tilting lever; E, the coupling-frame; F, the finger-bar; G, the connecting-rod that connects the knife H with the rotating crank I, which parts may be any of the usual forms that are well-known on the market in mowing-machines. Pivoted upon the tongue C on a pivot-casting C' is a hand lifting-lever J, which has upon it a spring-pressed detent $c$, that bears upon a segment of a flange $c'$ on the pivot-casting C'. This flange has a notch $c^2$ in that part of its sweep that is reached by the lifting-lever when it has been given its extreme of movement, and which, by means of the detent $c$, locks the lever in this position. There is no other detent in the flange, and the operator therefore does not have to unlock the detent from a notch, when grasping the lever, to move it from a position which is occupied by the lever when the cutting apparatus is upon the ground. After the parts have been raised, however, the detent must be unlocked to drop them. Pivoted upon the pivot-casting C', upon the same pivot as the hand lifting-lever J, is a primary lever K, one arm of which projects forwardly from this pivot and is fitted with a flanged quadrant $j$, and to which arm a connection L extends to the cutting apparatus. The primary lever K is projected rearwardly beyond its pivot, and a foot-lever M is pivoted to it on a one-way joint, which lever extends rearwardly and is suitably curved to bring its extremity within convenient reach of the foot of the operator. There is also pivoted upon the primary lever K a secondary lever K', that is so formed as to have one arm that projects into the path of the hand-lever J and another arm that projects at an angle to the first-mentioned arm from the pivot of the secondary lever upon the primary lever, to which arm a strong spring N is connected, one end of which spring is fastened to the tongue C, and the other, by means of a bent link $n$, is connected to the secondary lever K'. By this construction the force of the spring is exerted upon the secondary lever, tending to rock it upon its pivot, which motion is resisted by the arm of the secondary lever coming in contact with the lifting-lever, thus throwing the lifting-lever forward against a stop $c^3$ on the pivot-casting C'.

Figure 5:
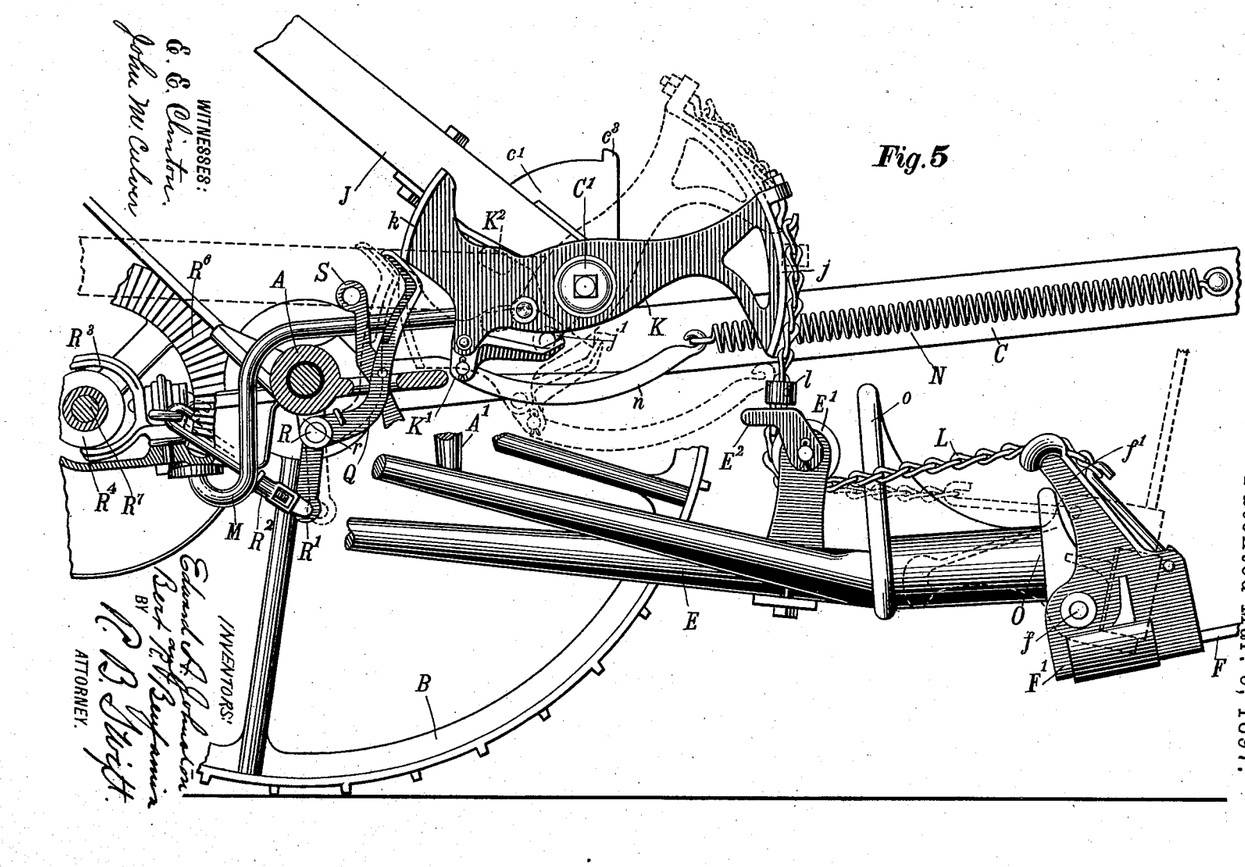
Fig. 5 is an enlarged view, except that the gearing of the machine has been more fully shown, while a position of the coupling-frame that follows from the movement of the lifting device that is given by the final action of the hand-lever is shown in dotted lines.

There is a stop $K^2$ on the primary lever K, (shown more plainly in dotted lines in Fig. 5,) against which the hand-lever J will strike after it has moved a certain distance, and thus form a rigid connection between the two levers, so that the power thrown upon the hand-lever will be exerted upon the primary lever. In the construction shown in the drawings the hand-lever J has an extension $j'$ projecting from the lever, against which one end of the secondary lever K' is drawn by the stress of the spring, and the hand-lever is thus held forward against the stop $c^3$ and away from the stop $K^2$ on the secondary lever. The secondary lever thus has a capacity of rocking on its pivot, as the parts that are connected to it rise and fall as they pass over rough ground, without disturbing the position of the hand-lever. The foot-lever M, it will be noticed, has a stroke that does not continue throughout the full stroke that can be given the primary lever by the hand-lever, and it is therefore necessary that it should be pivoted upon the primary lever on a one-way pivot, so that the primary lever can continue its movement beyond the movement of the foot-lever.

Figures 1, 6:
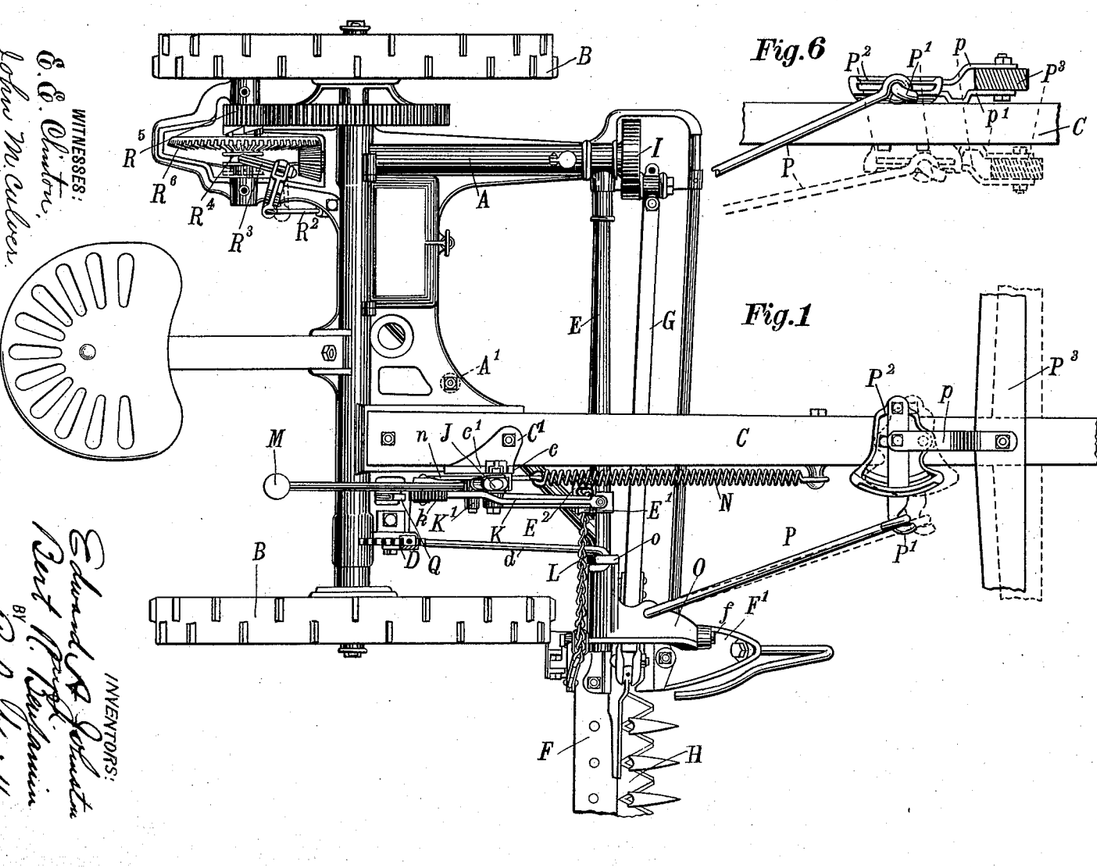
Figure 1 is a top view of a front-cut two-wheel mowing-machine, the finger-bar being broken off in order to make the view of larger size and the covering that goes over the gearing being removed.
Fig. 6 is a view showing the arrangement of the draft device above the tongue in full lines and beneath the tongue in dotted lines.
Figures 2, 7:
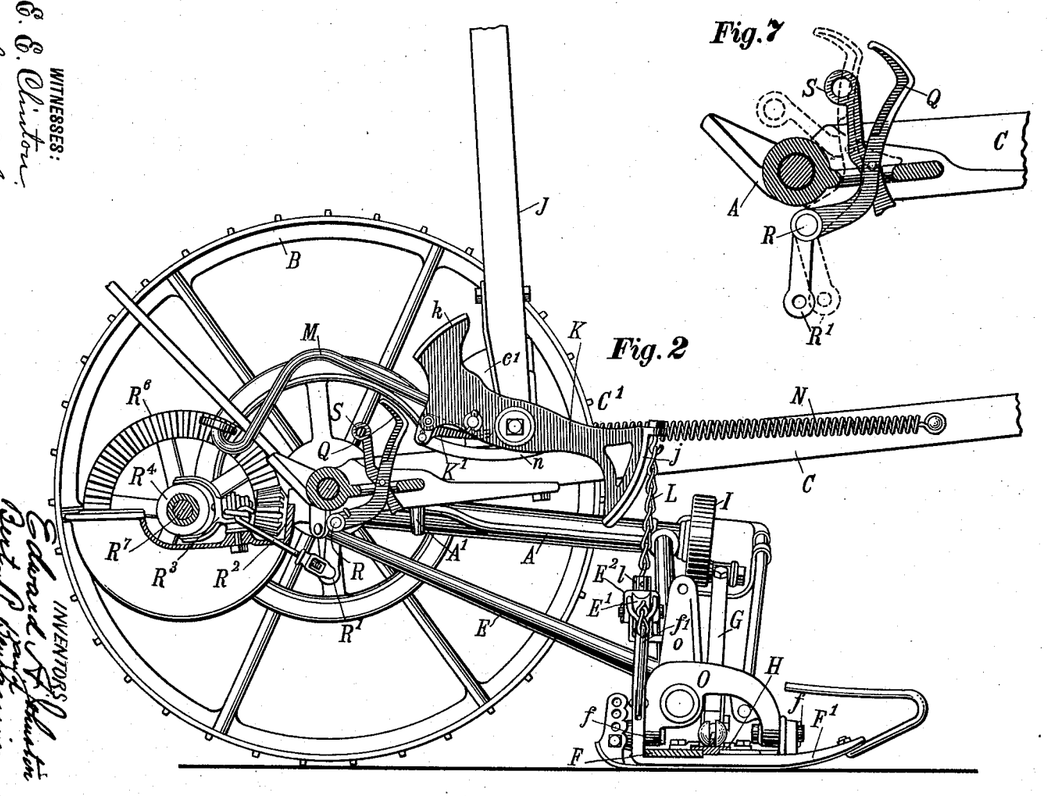
Fig. 2 is a side view from the grass side of the machine with the inside wheel and a part of the main frame that surrounds the gearing broken away to more clearly show the construction of the parts.
Fig. 7 is an enlarged view of the bent arm that is positioned in the path of the cam on the primary lever that throws the clutch from engagement, and in dotted lines is shown the position of the parts when a dog that is pivoted to this bent arm is holding the lever so that the clutch is out of engagement.
Figure 3:
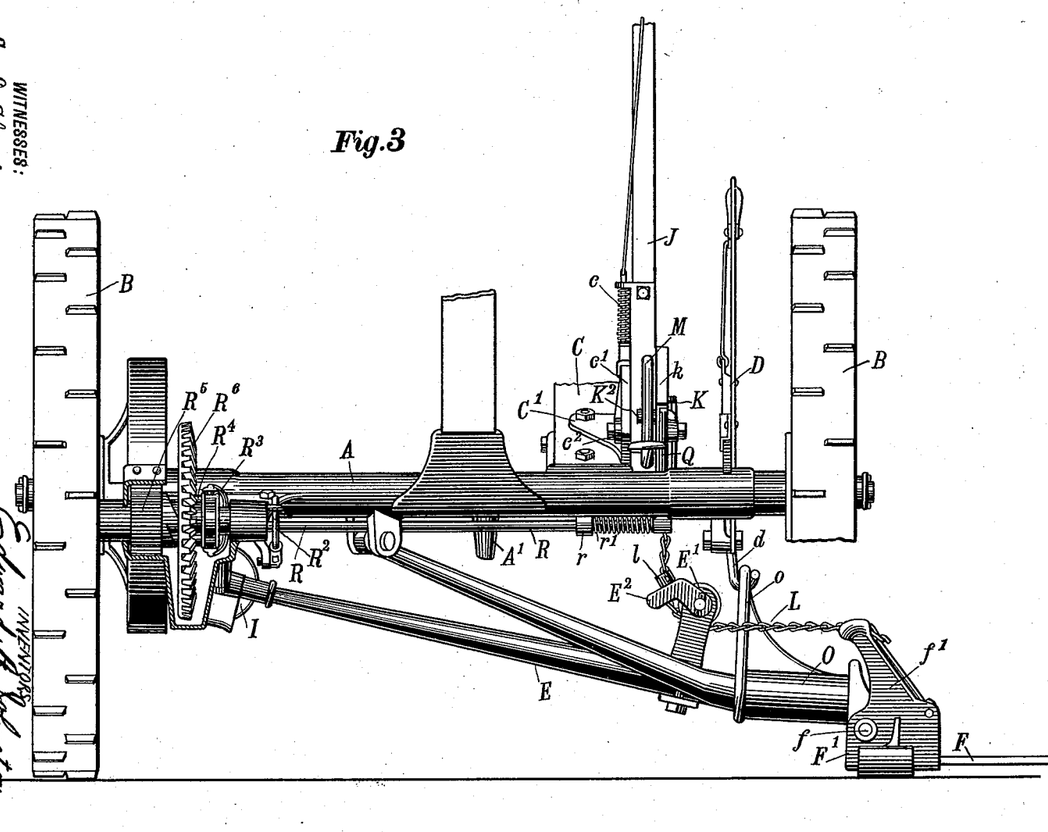
Fig. 3 is a rear view of the machine with parts of the gearing, inside wheel, and seat broken away.

The coupling-frame E is pivoted at its inner extremity to the main frame A of the mower, and on its outer extremity is sleeved a bridge-piece O, to which the shoe F' on the finger-bar F is pivoted by the pivot-pins $ff$. The bridge-piece O and the finger-bar pivoted to it are prevented from rolling on the coupling-frame by means of the post $o$ and the tilting connecting-rod $d$, which is connected to the tilting lever D. As shown in the drawings in Fig. 1, a draft-rod P also connects the bridge-piece O with the shifting doubletrees upon which the draft of the team takes place. The connection L, that unites one arm of the primary lever K with the cutting apparatus, extends downwardly from the lever and passes beneath a pulley E' on the coupling-frame E and then outwardly and is connected to the finger-bar at a point outside of the pivot of the finger-bar to the coupling-frame. This connection L as it leaves its fastening on the finger-bar is raised by a post $f'$ on the shoe F', so that any stress thrown upon the connection will be exerted upon the finger-bar over the post to rock the finger-bar on its pivot, raising the outer end of the bar. The connection, however, rests upon the post $f'$ and is held thereon by flanges on the extremity of the post until the motion of the finger-bar, when it is turned toward its vertical position, swings the post from beneath the connection L, the point of attachment of the connection to the finger-bar swinging upwardly on its pivot, and any strain that is applied to the connection will tend at first to raise the outer end of the bar, rocking it on its pivot, and when continued will pull the bar still upwardly at its outer end to a vertical position at the side of the machine and hold it there. The amount of leverage necessary upon the outer end of the finger-bar depends upon the length of the bar, and the length of the post must therefore be proportioned to the length of the bar, while the position of attachment of the connection to the finger-bar must also be to or from the pivot, dependent upon the length of the bar.

The connection L, as before remarked, passes beneath the pulley E', that is connected to the coupling-frame E, and any strain thrown upon the connection L thus tends to raise the coupling-frame as the connection draws around the pulley. There is pivoted to the post upon which the pulley E' is supported from the coupling-frame E a spreader-bar $E^2$, through which the chain passes and against which a stop $l$ on the chain strikes when the cutting apparatus is upon the ground in working position. The spreader-bar $E^2$ is by this stop drawn downwardly upon its pivot, so that it occupies a position nearly horizontal, from which it swings on its pivot as the outer end of the finger-bar rises over hummocks or sinks into depressions. When, however, power is applied to the connection L to raise the parts, the stress of the connection around the spreader-bar $E^2$ causes the strain to be transmitted to the finger-bar, throwing up the outer end of the bar before the inner end and the coupling-frame are lifted.

Figure 4:
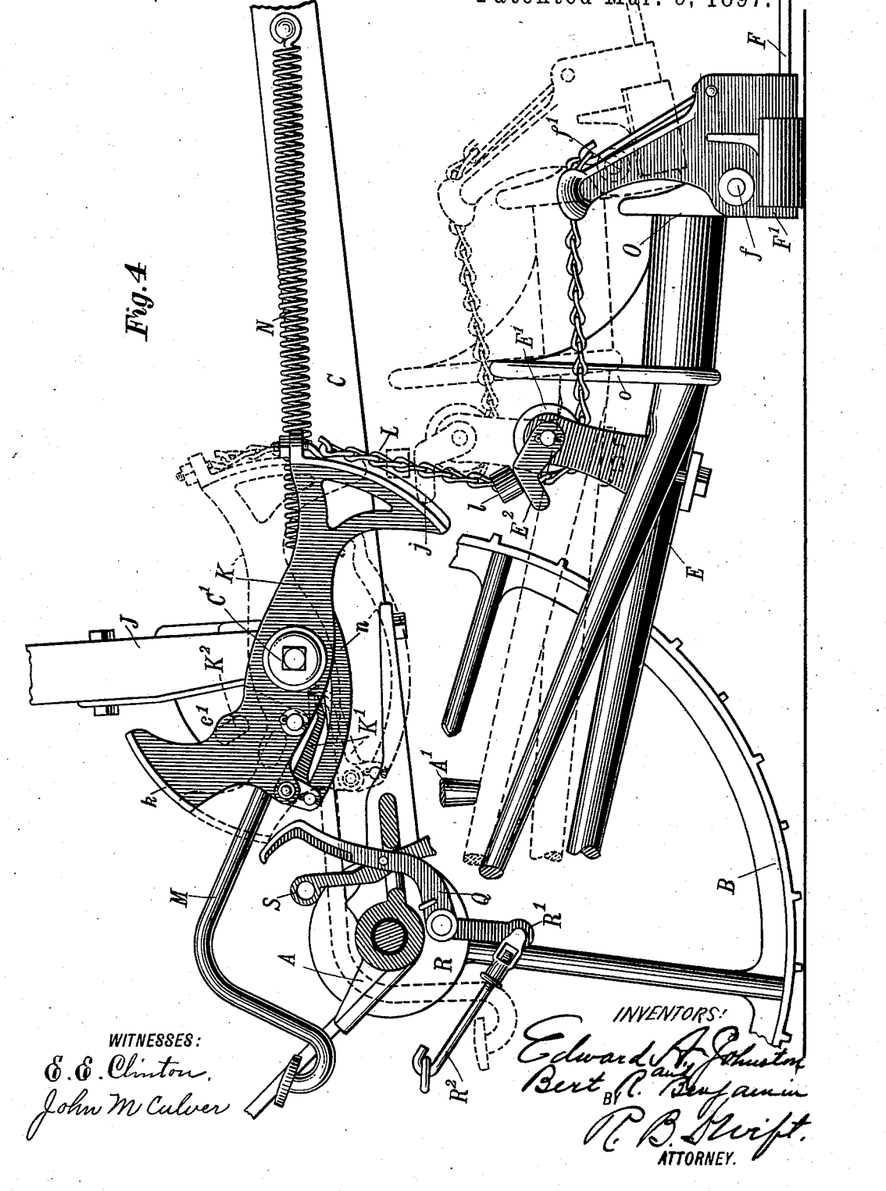
Fig. 4 is an enlarged side view from the side of the mower with the inside wheel entirely removed and the outside wheel partly broken away and the gearing entirely removed, while the coupling-frame has been, in the view, thrown into a plane at right angles to its normal position in order to show in the same view the arrangement of the lifting-lever and its connections with the coupling-frame and finger-bar and also with the devices that unclutch the mower when the bar is thrown into a vertical position. In dotted lines is shown the position of the parts that follows from the movement of the foot-lever.

It has been found after practical work in the field that it is necessary that the outer end of the finger-bar be raised higher than the inner end when the coupling-frame and finger-bar are raised, and that it is desirable that the first movement of the raising device be transmitted to the outer end of the bar, and that as soon as the outer end has been raised a short distance the inner end and coupling-frame be lifted, the outer end of the bar rising with the inner end and maintaining the same relation to the inner end and the coupling-frame as it had when these parts started their upward movement. The usual method of accomplishing this result is by means of a gag-lever, which is fitted with a stop that makes a rigid coupling between the finger-bar and coupling-frame after the outer end of the bar has been raised to the required height and then the finger-bar and coupling-frame be lifted together. The spreader-bar $E^2$ performs this office. The stop $l$ on the connection L strikes against this bar when the parts approach the ground and swings the spreader-bar on its pivot, thus carrying the connection partly away from the face of the pulley E'. Any strain thrown upon the connection is thus given a greater leverage upon the outer end of the bar than it would have were the connection L resting upon the pulley E'. The reason of this is because the spreader-bar has less friction than the pulley and swings on a longer radius. The finger-bar post and the attachment of the pulley E' to the coupling-frame are so positioned that the strain applied to the connection L will raise the parts together when the connection rests upon the face of the pulley. The spreader-bar $E^2$, however, gives a better leverage upon the outer end of the finger-bar, and the outer end is raised until the spreader-bar swings far enough so that the connection rests upon the face of the pulley. Then the coupling-frame and finger-bar are raised together. When, however, the coupling-frame has been brought up as close to the frame of the machine as possible, it strikes against a stop A', as shown more clearly in Fig. 4, where the dotted lines that represent the coupling-frame have come against the stop. The coupling-frame is thus prevented from rising any higher and the continued pull upon the connection L is thus transmitted, because of the travel of the pulley E', to the finger-bar, which will be swung on its pivot to the coupling-frame and thrown into a vertical position, as shown in dotted lines in Fig. 5.

So far as explained the action of the spring between the frame of the machine and one arm of the primary lever K has not been referred to as having any effect in the raising of the cutting apparatus. In the construction shown in the drawings, however, the spring is always in action, tending first to rock the secondary lever on the primary lever, thus holding the hand-lever forward in one position where it does not vibrate as the machine moves over rough ground, and then to swing the primary lever on its pivot, thus applying power to the connection that connects the cutting apparatus with the lifting devices. This strain, being continued while the machine is in operation, tends to lift the coupling-frame and also the finger-bar throughout its entire length, thus making them rest more lightly upon the ground, relieving the friction as the parts are drawn forward over the ground, decreasing draft, and making the parts more easily handled by the operator when it becomes necessary to adjust them.

This description so far has proceeded on the presumption that a finger-bar could be turned up vertically to the side of the machine by the lifting device whenever the operator chose. It, however, is plain to be seen that the angle between the finger-bar and the coupling-frame could not become too great without the knife, driven, as it is, by a long connecting-rod from gearing on the outside of the machine, binding in the finger-bar, and finally, as the bar continues its upward movement, absolutely preventing the reciprocation of the knife and thus stop the machine. In the ordinary conditions of operation in the field it is not necessary to throw the bar into a vertical position. In fact, it is not necessary to raise the coupling-frame and finger-bar any higher than will allow them to pass small obstructions and to get over the cut crop. This movement is not sufficient to prevent the reciprocations of the knife through the finger-bar. When, however, large obstructions are encountered or the mower is to be transported from field to field, the finger-bar must be thrown into a vertical position, and then the knife will not reciprocate.

Figure 8:
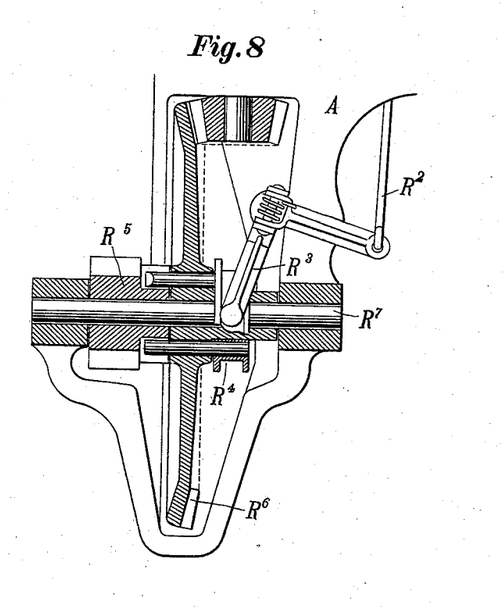
Fig. 8 is a view, partly in section, of the clutch mechanism.

In order to unclutch the gearing of the mower from the crank that reciprocates the knife at the time when the coupling-frame and finger-bar have been lifted to about the highest position in which the knife can be reciprocated, and then without the attention of the driver, the primary lever K is extended rearwardly and its extremity widened to form a track $k$, that will, when the primary lever is rocked on its pivot by the hand-lever after it has moved a certain distance, come into contact with a shipping-arm Q, that is keyed to a transverse rod R, that is mounted upon bearings $r$ on the main frame A. This rod extends transversely beneath the frame of the mower until it nearly reaches the gearing on the outside of the machine. It is thus hidden from sight and is out of the way of the operator. At that place an arm R' is keyed to the shaft, the extremity of which is connected by an adjustable link $R^2$ with the shipping-fork $R^3$, that is pivoted in the main frame A of the mower, the fork of which shipper rests between flanges on the clutch R⁴. This clutch is formed by a spur-pinion R⁵ and the bevel-wheel R⁶, both loosely mounted upon the cross-shaft R⁷. The spur-pinion R⁵ is notched on the end of its hub that is toward the bevel-wheel R⁶, and the clutch R⁴, with its forks, slides on the hub of the bevel-wheel R⁶. The forks of the clutch pass through holes in the bevel-wheel and enter the notches of the spur-pinion and the parts are clutched together, as shown in Fig. 8. The rocking of the transverse rod R transmits power by means of the shipping-arm Q to throw the clutch in and out of engagement. A spring $r'$ on the transverse shaft R is so arranged as to exert its force to keep the clutch always in engagement.

From the description so far given it is seen that did the operator take hold of the hand-lever J he could, through the connecting devices, move the clutch back and forth. As the arm is thrown to move the clutch from engagement it has to overcome the stress of the spring. Whenever the arm is released, the spring will be of sufficient force to throw the clutch immediately into engagement. Pivoted upon the shipping-arm Q where this arm passes through a hole in the frame of the mower so as to come into the path of the track $k$ on the primary lever K is a locking-dog S, which has a hole in one end to be conveniently grasped by the hand of the operator and on the other end a concave blunt extremity that will, when the operator draws back on the dog, strike against the mower-frame and hold the clutch out of engagement. The end of the shipping-arm Q is bent to conform to the track $k$ on the primary lever K, so that when the two have come in contact a slight movement of the lever K will be sufficient to throw the clutch from engagement.

Attention is called to the fact that the movement of the lifting device that is given by the foot-lever is only sufficient to raise the coupling-frame and finger-bar into a horizontal position, the outer end of the finger-bar, because of the gagging done by the spreader-bar, being raised slightly higher than the inner end, the unclutching devices at this time having nearly come into contact. The further action upon the hand-lever which would result in raising the finger-bar toward a vertical position would immediately unclutch the parts.

As before remarked, the draft-rod P connects the bridge-piece O with the shifting doubletrees by means of the draft-lever P', which is pivoted at one end to the pole on a draft-plate P². This draft-plate is secured to the tongue by bolts, and in Fig. 6 it is shown on top of the tongue. The doubletree P³ is connected with the draft-lever P' by the straps $p$ above and $p'$ below, the strap $p'$ having a seat formed in it which rests upon the tongue and keeps the head of the bolt that fastens the straps to the doubletree from cutting into the tongue. Owing to the changing conditions of the ground, the different weights of drivers upon the seat and the effect they have in the balance of the machine, and to the different sizes of horses that are used upon mowing-machines, it is desirable that the draft device be sometimes positioned above the tongue and sometimes beneath it, as shown in dotted lines in Fig. 6. With a heavy driver, that takes much of the weight from the end of the tongue and from the horses' necks, the draft-lever can be put upon top of the tongue and the downward pull upon the draft connection from the cutting apparatus will be equalized by the heavy driver, or if the team is a large one they will exert as much upward pull on a draft device on top of the tongue as will a small team on a draft device beneath the tongue. The necessity for changing the point of draft makes it desirable that an arrangement shall be formed by which it can be done quickly and without additional parts when used in one position that are not necessary for use in the other position. Any such parts as these become lost and cause trouble. To meet these requirements, the draft-lever P' has been pivoted upon the plate P² at a point on the draft-plate that is at one side of a vertical plane that passes transversely through the center of the draft-plate. When the draft-plate is above the tongue, the draft-rod P must be of greater length than when below the tongue, and therefore the draft-lever P' is pivoted to the plate at a point more nearly toward the mower, and the draft-rod is thus long enough to reach. When, however, it is beneath the tongue, the plate is turned over, and the pivot being outside of the center is thrown forward to the other side of the vertical plane, passing transversely through the center of the plate, and the lever is thus thrown ahead, as shown in dotted lines in Figs. 1 and 6.

We are aware that mowers have been built in which the lifting device has been connected to the finger-bar, so that it can be thrown up vertically from the seat, and the same movement has unclutched the gearing from the knife. We therefore do not claim such broadly.

What we do claim, and desire to secure by Letters Patent, is—

1. In combination in a mowing-machine with the main frame and a raising device mounted thereon, a coupling-frame pivoted to the main frame, a finger-bar pivoted to the coupling-frame, a connection from the raising device to the finger-bar, the attachment of the connection to the finger-bar being between the pivot and the grass end of the finger-bar, and a post on the finger-bar over which the connection passes, substantially as and for the purpose specified.

2. In combination in a mowing-machine, a main frame and coupling-frame pivoted thereto, a finger-bar pivoted to the coupling-frame, a raising device mounted on the main frame and connected with the coupling-frame and finger-bar, the point of attachment of the connection to the finger-bar being between the pivot and the grass end of the finger-bar, a post on the finger-bar that extends above the pivot of the finger-bar to the coupling connection and over which the connection from the lifting device passes, whereby the strain thrown upon the connection by the lifting device will be exerted to rock the finger-bar on its pivot, substantially as and for the purpose specified.

3. In combination in a mowing-machine with the main frame and its cutting apparatus, consisting of the coupling-frame pivoted to the main frame and the finger-bar pivoted to the coupling-frame, a lifting device pivoted on the main frame, a connection extending from the lifting device to the finger-bar, which connection passes beneath a pulley attached to the coupling-frame and extends over a post on the finger-bar and downwardly from the extremity of the post outward toward the end of the finger-bar, where it is attached, and a spring to act upon the connection, whereby the spring aids in lifting the coupling-frame and finger-bar and in folding the finger-bar vertically.

4. In combination in a mowing-machine, a device for handling the coupling-frame and finger-bar of a mowing-machine, consisting of a lifting-lever pivoted on the frame of the mower, a flexible connection uniting the lifting-lever with the finger-bar and passing under a pulley attached to the coupling-frame, a stop on the flexible connection, and a spreader-bar pivoted to the coupling-frame through which the chain passes on its way to the finger-bar, and against which the stop strikes, swinging the spreader-bar on its pivot as the coupling-frame and finger-bar float over the ground in mowing.

5. In combination in a mowing-machine, with the main frame mounted upon the truck, the coupling-frame pivoted thereto and a finger-bar pivoted to the coupling-frame, a lifting-lever pivoted on the main frame, one arm of which is connected with the finger-bar by means of a flexible connection that passes under a pulley that is mounted on a bearing connected with the coupling-frame, an arm pivoted to the bearing that supports the pulley, against which arm a stop fastened to the flexible connection strikes and swings the arm around its pivot when the coupling-frame and finger-bar are dropped to the ground, whereby the strain of the coupling-frame and finger-bar on the flexible connection is thrown from the pulley and the effective lifting force on the finger-bar is increased, substantially as and for the purpose specified.

6. In combination in a mowing-machine, with the main frame, a coupling-frame pivoted thereto, a finger-bar pivoted to the coupling-frame, a lifting device pivoted on the main frame and connected to the coupling-frame, a lifting device consisting of a hand-lever pivoted upon the machine, a primary lever pivoted on the same center as the lifting-lever, one arm of the primary lever being connected to the coupling-frame and finger-bar, a secondary lever pivoted to the primary lever, one arm of which is drawn against the lifting-lever by a spring, substantially as and for the purpose specified.

7. In combination in a mowing-machine, a hand-lever pivoted upon the machine, a flange against which a dog on the hand-lever travels, a stop on the flange to hold the hand-lever from being thrown too far forward, a primary lever pivoted on the machine and fitted with a stop against which the hand-lever strikes when power is applied to the hand-lever to rock the primary lever on its pivot, a connection uniting one arm of the primary lever with the coupling-frame and finger-bar of the mower, a secondary lever pivoted to the other arm of the primary lever, one arm of which secondary lever is held against the hand-lever by a spring which reacts between the machine-frame and the other arm of the secondary lever, all substantially as and for the purpose specified.

8. In combination in a mowing-machine, with the main frame and coupling-frame pivoted thereto, a finger-bar pivoted to the coupling-frame, a hand-lever pivoted on the main frame, a primary lever pivoted on the main frame, against one arm of which the hand-lever comes in contact when it is rocked on its pivot, one arm of the primary lever being connected by a flexible connection that passes beneath a pulley attached to the coupling-frame and extends to a point of attachment on the finger-bar that is positioned outward from the pivot of the finger-bar to the coupling-frame, an arm pivoted on the bearing of the pulley beneath which the flexible connection passes, which arm is rocked on its pivot around the center of the pulley, and changes the direction of the strain upon the connection, whereby power is transferred to the finger-bar, raising the outer end of the finger-bar before the inner end is raised, substantially as and for the purpose specified.

9. In combination in a mowing-machine, a main frame having a tongue connected thereto, a cutting apparatus pivotally connected to the main frame, a draft-plate attached to the tongue, a pivot on the plate located outside of the transverse plane that contains the line on which the plate turns when reversed for attachment beneath the tongue, a draft-lever pivoted on the plate and a draft-rod connecting the draft-lever with the cutting apparatus, substantially as set forth.

EDWARD A. JOHNSTON.
     BERT R. BENJAMIN.

Witnesses:
 GEORGE C. BLACKMER,
 MORGAN B. EDGERTON.